(12) United States Patent
Perlman et al.

(10) Patent No.: US 11,240,005 B2
(45) Date of Patent: Feb. 1, 2022

(54) METHOD AND SYSTEM FOR QUERYING A SECURE DATABASE LOCATED ON AN UNTRUSTED DEVICE

(71) Applicant: EMC IP Holding Company LLC, Hopkinton, MA (US)

(72) Inventors: Radia Joy Perlman, Redmond, WA (US); Charles William Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 16/665,609

(22) Filed: Oct. 28, 2019

(65) Prior Publication Data

US 2021/0126773 A1 Apr. 29, 2021

(51) Int. Cl.
*G06F 16/00* (2019.01)
*H04L 9/06* (2006.01)
*G06F 16/22* (2019.01)
*G06F 16/27* (2019.01)

(52) U.S. Cl.
CPC ........ *H04L 9/0643* (2013.01); *G06F 16/2246* (2019.01); *G06F 16/2255* (2019.01); *G06F 16/27* (2019.01)

(58) Field of Classification Search
CPC ... G06F 16/27; G06F 16/2246; G06F 16/2255
See application file for complete search history.

(56) References Cited

U.S. PATENT DOCUMENTS

| | | | |
|---|---|---|---|
| 8,706,701 B1* | 4/2014 | Stefanov | G06F 11/1088 |
| | | | 707/687 |
| 2017/0139985 A1* | 5/2017 | Hahn | G06F 16/9535 |
| 2018/0013567 A1* | 1/2018 | Davis | H04L 9/3242 |
| 2018/0089041 A1* | 3/2018 | Smith | G06F 16/2255 |
| 2020/0076571 A1* | 3/2020 | Natarajan | G06F 16/2246 |

* cited by examiner

*Primary Examiner* — Khanh B Pham
(74) *Attorney, Agent, or Firm* — Chamberlain, Hrdlicka, White, Williams & Aughtry (57) ABSTRACT

In general, embodiments of the invention relates to a method for managing data, the method includes obtaining, by an untrusted device and from a querying system, an item query, identifying a leaf block of a hierarchical block tree associated with the item query, identifying a plurality of indirect blocks that allow the querying system to calculate a top hash of the hierarchical block tree, and sending an item query response to the querying system, wherein the item query response specifies the leaf block, the plurality of indirect hashes corresponding to the plurality of indirect blocks, and a signature of the top hash, wherein the signature is obtained from a trusted system.

18 Claims, 10 Drawing Sheets

METHOD AND SYSTEM FOR QUERYING A SECURE DATABASE LOCATED ON AN UNTRUSTED DEVICE

BACKGROUND

Computing devices may include any number of internal components such as processors, memory, and persistent storage. Data sent between computing devices may be subject to undesired exposure to additional computing devices. Computing devices may implement security measures in an attempt to reduce the undesired exposure.

SUMMARY

In general, in one aspect, embodiments of the invention relates to a method for managing data, the method includes obtaining, by an untrusted device and from a querying system, an item query, identifying a leaf block of a hierarchical block tree associated with the item query, identifying a plurality of indirect blocks that allow the querying system to calculate a top hash of the hierarchical block tree, and sending an item query response to the querying system, wherein the item query response specifies the leaf block, the plurality of indirect hashes corresponding to the plurality of indirect blocks, and a signature of the top hash, wherein the signature is obtained from a trusted system.

In general, in one aspect, embodiments of the invention relates to non-transitory computer readable medium comprising computer readable program code, which when executed by a computer processor enables the computer processor to perform a method for managing data, the method comprising obtaining, by an untrusted device and from a querying system, an item query; identifying a leaf block of a hierarchical block tree associated with the item query; identifying a plurality of indirect blocks that allow the querying system to calculate a top hash of the hierarchical block tree; and sending an item query response to the querying system, wherein the item query response specifies the leaf block, the plurality of indirect hashes corresponding to the plurality of indirect blocks, and a signature of the top hash, wherein the signature is obtained from a trusted system.

In general, in one aspect, embodiments of the invention relates to an untrusted device, comprising: a processor; memory comprising instructions, which when executed by the processor cause the untrusted device to perform a method, the method comprising: obtaining, by an untrusted device and from a querying system, an item query; identifying a leaf block of a hierarchical block tree associated with the item query; identifying a plurality of indirect blocks that allow the querying system to calculate a top hash of the hierarchical block tree; and sending an item query response to the querying system, wherein the item query response specifies the leaf block, the plurality of indirect hashes corresponding to the plurality of indirect blocks, and a signature of the top hash, wherein the signature is obtained from a trusted system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for verifying responses to item queries. Embodiments of the invention include obtaining a response, from an untrusted device, to a query that requests specifying whether an item (represented by an item identifier or a hashed item identifier) is included in a data structure (e.g., a list). The response may include portions of a hierarchical block tree that are used to rebuild a top hash of the hierarchical block tree. The querying device may use the portions (which may be hashes of other portions of the hierarchical block tree) to verify the response.

The following is a non-limiting example describing one or more embodiments of the invention. Turning to the example, consider a scenario in which a querying device sends a request to a database. If the database is on an untrusted device, then the response to the request may include incorrect data, e.g., because the untrusted device has modified the data in the database. Using embodiments of the invention, the database on the untrusted device is implemented using a hierarchical block tree (see e.g., FIGS. 2A-2C) that includes hash values as well as a signature of the top block of the hierarchical block tree. The signature is provided by a trusted system. Accordingly, when the request is generated by the untrusted device, the request includes a result of the request (e.g., a leaf block) along with a subset of the hash values from the hierarchical block tree and the signature. The querying system may then use the subset of hash values along with the signature to verify that the result is an actual result from the database. If the verification fails, then the querying device determines that the result in the response is not a valid result and, as such, does not rely on the result. In this manner, embodiments of the invention enable a querying device to utilize a relatively small set of data (e.g., the subset of hash values and the signature) to verify the result and at the same time decrease the resources utilized by the untrusted device to provide a response that can be verified by the querying device.

Further, embodiments of the invention may include hashes of values instead of the values themselves within the database. As a result, the hierarchical block tree is organized based on the hash values instead of the values from the hash values are generated. The use of hash value further secures the contents of the database as the untrusted device only has access to the hash values and not the underlying values. Moreover, the use of hash values may further obfuscate the contents of the database thereby preventing a malicious querying device from enumerating the values stored in the database as the database only stores hash values.

Figure 1:
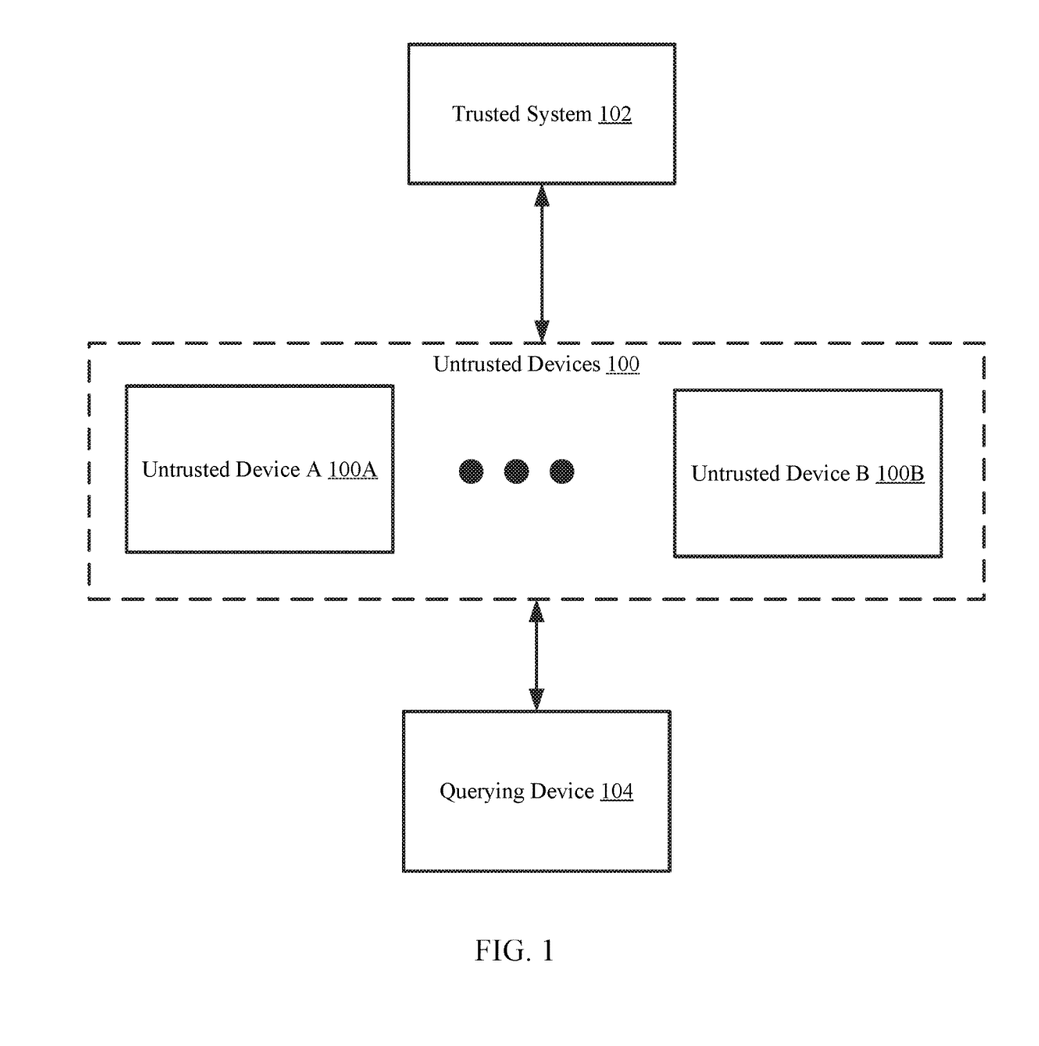
FIG. 1 shows a diagram of a system in accordance with one or more embodiments of the invention.

FIG. 1 shows a diagram of a system in accordance with one or more embodiments of the invention. The system includes a trusted system (102), one or more untrusted devices (100), and a querying device (104). Each component of the system may be operably connected via any combination of wired and/or wireless connections. Each component of the system illustrated in FIG. 1 is discussed below. Various embodiments of the invention are described below with respect to a list; however, the invention may be implemented using data structures other than a list without departing from the invention.

In one or more embodiments of the invention, the trusted system (100) includes information about items, which may be represented as item identifiers or hashed item identifiers. The item identifiers may each specify an item that belongs in the list. The list may be associated with a category (e.g., a list of excluded items, a list of verified items, a list of deleted items, etc.). The content of the list (i.e., which items are specified in the list) may be useful to other entities (e.g., a querying device (104)). The items may be, for example, signed documents, files, a data set, and/or any other individual groupings of data without departing from the invention.

In one or more embodiments of the invention, the trusted system (102) provides accurate representation of the content of the list. Said another way, the content of the list may not be modified by a malicious entity with the intent of deceiving other entities about the inclusion or exclusion of items in the list. For example, the trusted system may utilize encryption, block chain ledgers, and/or security measures on the list to prevent the list from being undesirably manipulated.

In one or more embodiments of the invention, the list (or more specifically the content of the list) may be stored using a hierarchical block tree. In one or more embodiments of the invention, a hierarchical block tree is a data structure that specifies multiple leaf blocks and a hierarchy of indirect blocks associated with the leaf blocks and the other indirect blocks. The hierarchical block tree may be used by a device analyzing the list to verify whether a leaf block that specifies a portion of the items on the list is valid. For additional details regarding a hierarchical block tree, see, e.g., FIGS. 2A-2C.

In one or more embodiments of the invention, the trusted system (102) distributes the hierarchical block tree to each untrusted device (100A, 100B). The trusted system (102) may further generate a signature of the top hash of the hierarchical block tree using a private key and distribute the signature to the untrusted devices (100) to be used by the querying device (104) for verification. The private key is not shared by the trusted system (102) with the untrusted devices (100A, 100B). In this manner, the signature cannot be replicated by the untrusted devices (100), which prevents the untrusted device (100A, 100B) from replicating the signature using a top hash of a maliciously modified (i.e., modified without the trusted system's approval) hierarchical block tree. While the system shown in FIG. 1 only includes a single trusted system, the system may be implemented using multiple trusted systems without departing from the invention.

Figure 5:
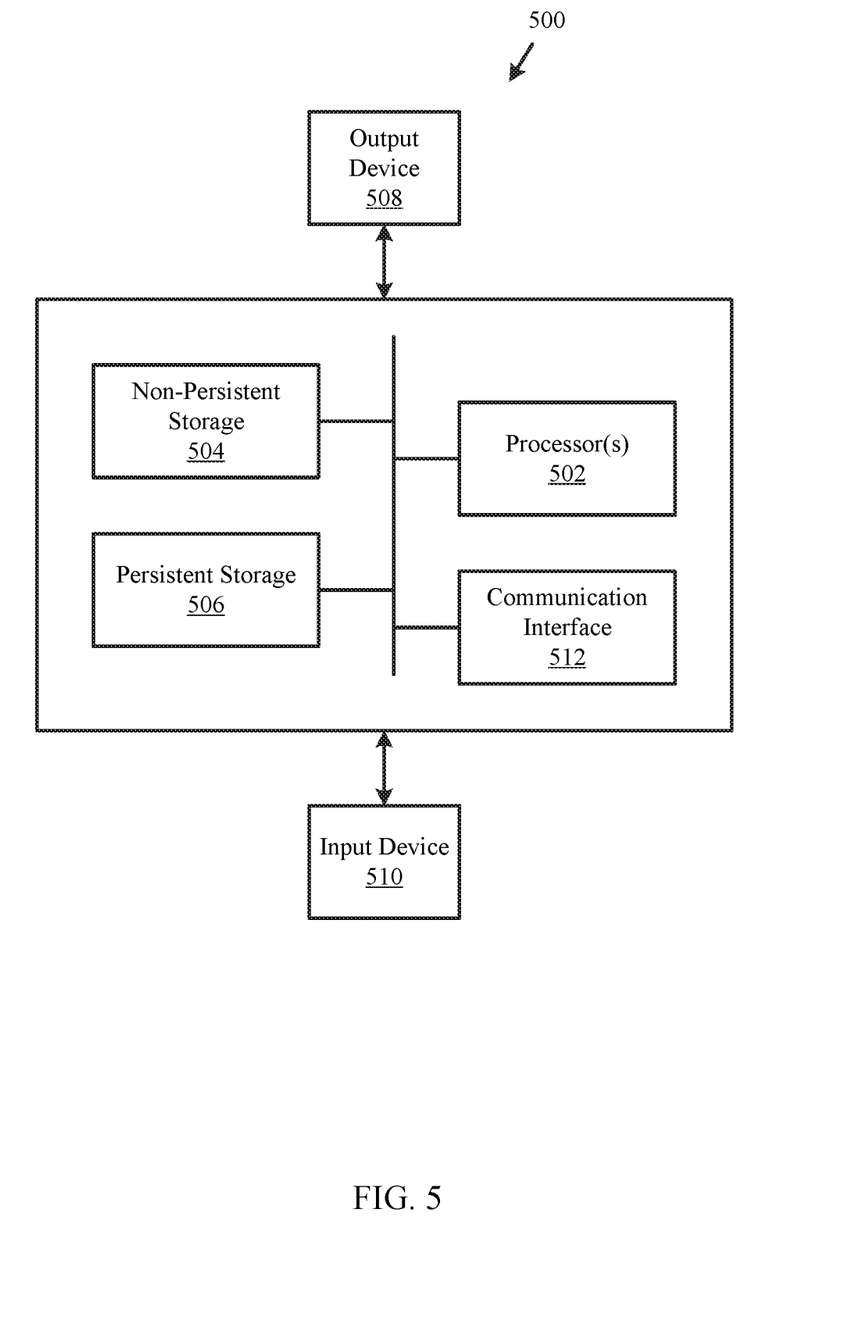
FIG. 5 shows a diagram of a computing device in accordance with one or more embodiments of the invention.

In one or more embodiments of the invention, the trusted system (102) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the trusted system (102) described throughout this application.

The trusted system (102) may be implemented as a logical device without departing from the invention. The logical device utilizes computing resources of any number of physical computing devices to provide the functionality of the trusted system (102) described throughout this application.

In one or more embodiments of the invention, the untrusted devices (100) store copies of the aforementioned list. The untrusted devices (100A, 100B) each obtain the list from the trusted system (102) (e.g., as a hierarchical block tree) and utilize the list to service item queries from the querying device (104).

In one or more embodiments of the invention, an untrusted device (100A, 100B) may store accurate or inaccurate versions of the list. For example, the list stored in the untrusted device (100A, 100B) may be outdated (i.e., the list does not contain the most recent information) and/or maliciously manipulated (i.e., items were added or removed without the trusted system's approval).

In one or more embodiments of the invention, each untrusted device (100A, 100B) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the untrusted device (100A, 100B) to perform the functionality of the untrusted device (100A, 100B) described throughout this application and/or all, or a portion thereof, of the method illustrated in FIGS. 2B-2C.

Each untrusted device (100A, 100B) may be implemented as a logical device without departing from the invention. The logical device utilizes computing resources of any number of physical computing devices to provide the functionality of the untrusted device (100A, 100B) described throughout this application and/or all, or a portion thereof, of the method illustrated in FIGS. 2B-2C.

In one or more embodiments of the invention, the querying device (104) utilizes the information of the list managed by the trusted system (102). The querying device (104) may request to identify whether a specified item is included in the list. The request may be sent to an untrusted device (100) as an item query. The item query may be serviced in the form of an item query response. The querying device (104) may verify the validity of the item query response via the method illustrated in FIG. 2A. While the system shown in FIG. 1 only includes a single querying device, the system may be implemented using multiple querying devices without departing from the invention.

In one or more embodiments of the invention, the querying device (104) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the querying device (104) described throughout this application and/or all, or a portion thereof, of the method illustrated in FIG. 2A.

The querying device (104) may be implemented as a logical device without departing from the invention. The logical device utilizes computing resources of any number of physical computing devices to provide the functionality of the querying device (104) described throughout this application and/or all, or a portion thereof, of the method illustrated in FIG. 2A.

Figure 2A:
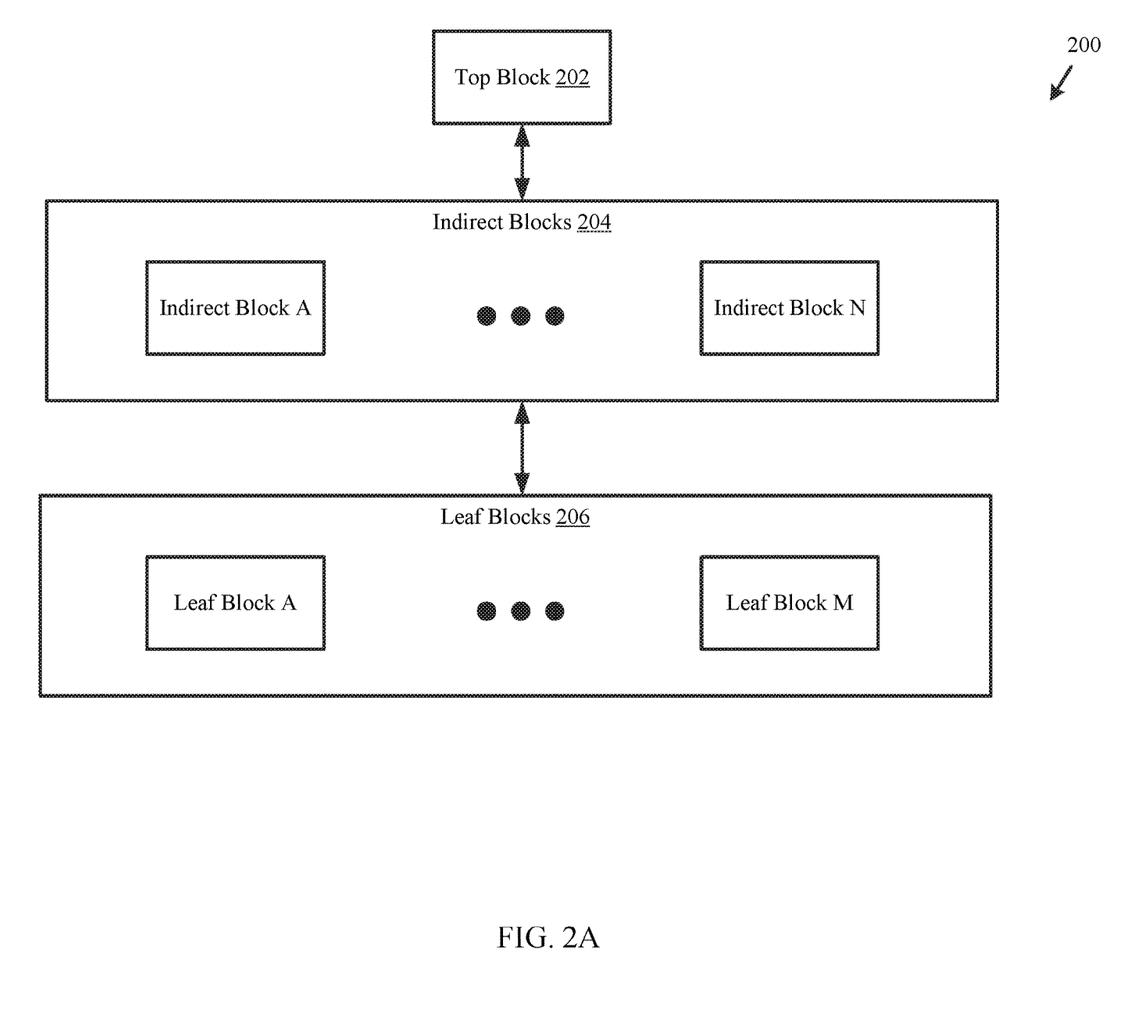
FIG. 2A shows a diagram of a hierarchical block tree in accordance with one or more embodiments of the invention.

FIG. 2A shows a diagram of a hierarchical block tree in accordance with one or more embodiments of the invention. The hierarchical block tree (200) includes a top block (202), two or more indirect blocks (204), and two or more leaf blocks (206). The hierarchical block tree may be implemented as a binary tree or a non-binary tree. Each portion of the hierarchical block tree is discussed below.

In one or more embodiments of the invention, the top block is a data structure that is generated based on the indirect blocks (204). The top block may include a covered range of hashed item identifiers (discussed in FIG. 2C) and/or a hash of two or more indirect blocks. In another embodiment of the invention, the top block does include a covered range; rather, the top block includes N−1 values that may be used by the untrusted device to traverse the hierarchical block tree, where N is the number of indirect blocks directly connected to the top block. In this scenario the top block may be logically associated with a covered range but does not itself store the covered range.

In one or more embodiments of the invention, the indirect blocks (204) are each data structures that are part of hierarchical block tree, where each indirect block may be based on one or more indirect blocks or one or more leaf blocks.

In one or more embodiments of the invention, the leaf blocks (206) are data structures that each specify a portion of a list and where collectively, the leaf blocks (206) specify all of the items in the list. The items in the list may be distributed among the leaf blocks (206) based on a hash of the identifiers. Specifically, each leaf block may be associated with a range of items in such a way that, collectively, the leaf blocks are associated with the covered range of the top block (202). In one embodiment of the invention, the range of items is a range of hash values. An embodiment of the hierarchical block tree is discussed in FIGS. 2B-2C.

Figure 2B:
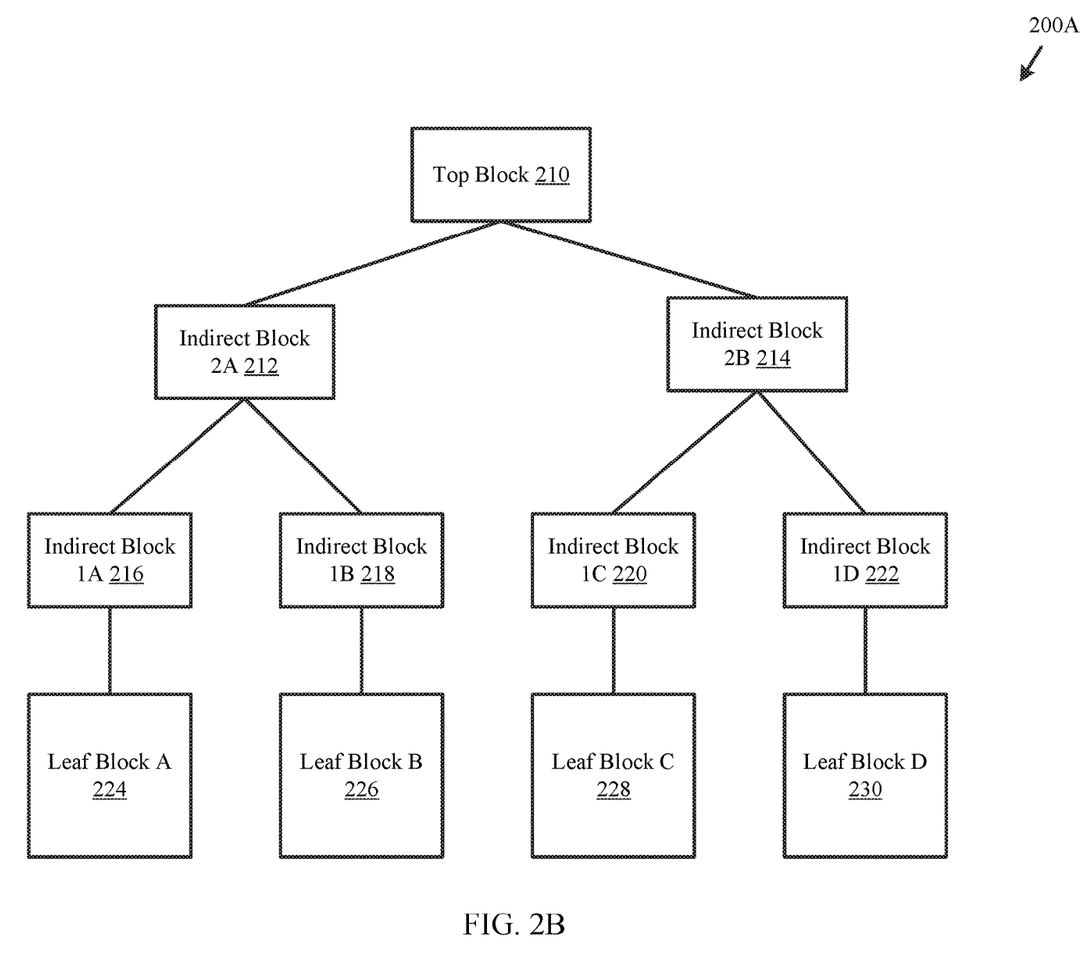
FIG. 2B shows a second diagram of a hierarchical block tree in accordance with one or more embodiments of the invention.

FIG. 2B shows a second diagram of the hierarchical block tree in accordance with one or more embodiments of the invention. The hierarchical block tree shown in FIG. 2B is not intended to limit the scope of the invention. The diagram of FIG. 2B may be an embodiment of the hierarchical block tree (200, FIG. 1) discussed above. The hierarchical block tree of FIG. 2B may be stored in the trusted system (102, FIG. 1) and/or any untrusted device (100A, 10B, FIG. 1) discussed above. The hierarchical block tree may include a top block (210), six indirect blocks (212, 214, 216, 218, 220, and 222), and four leaf blocks (224, 226, 228, 230).

In one or more embodiments of the invention, the leaf block includes the information useful to the querying system (and/or any other entity of FIG. 1). The leaf blocks may specify a portion of the list of hashed item identifiers included in the list.

In one or more embodiments of the invention, each indirect block (216, 218, 220, 222) connected to a leaf block (224, 226, 228, 230) is generated based on the respective leaf block (discussed below in FIG. 2C). Further, each indirect block (212, 214) is connected to two indirect blocks (216, 218, 220, 222) and is generated based on the two aforementioned indirect blocks (discussed below in FIG. 2C).

In one or more embodiments of the invention, the top block (210) is generated based on the two connected indirect blocks (212, 214). The top block (210) may be used along with a private key to generate a signature to be used for verification by the querying system.

In one or more embodiments of the invention, the two indirect blocks (e.g., 216, 218) associated with a higher level indirect block (e.g., 212) are deemed to be sibling blocks of each other. An indirect block is a sibling block of a second indirect block if the two indirect blocks are used to generate the same block. For example, indirect blocks 2A and 2B (212, 214) are sibling blocks, indirect blocks 1A and 1B (216, 218) are sibling blocks, and indirect blocks 1C and 1D (228, 230) are sibling blocks. Further discussion about the content of each block is discussed in FIG. 2C.

Figure 2C:
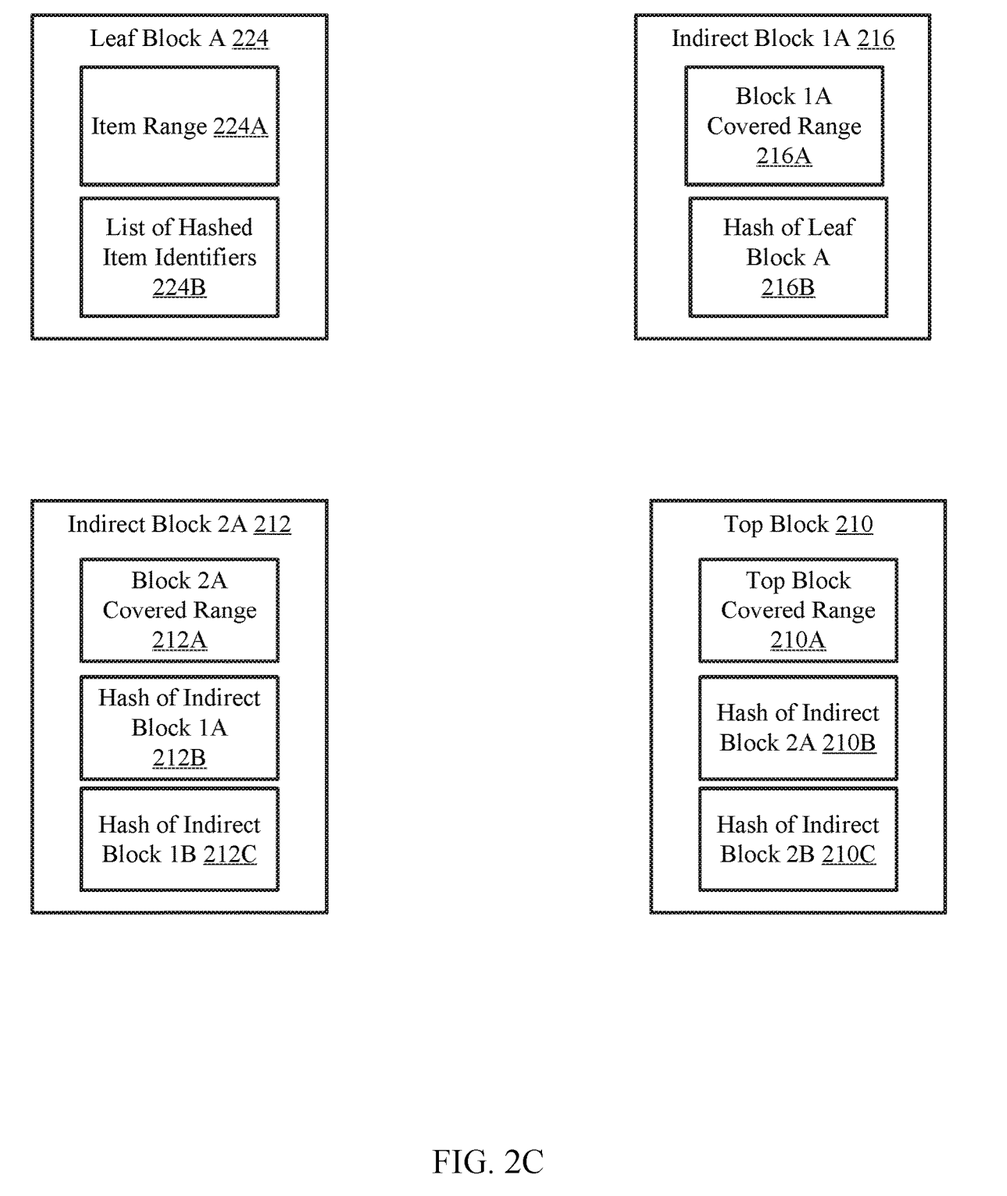
FIG. 2C shows a diagram of components in the hierarchical block tree in accordance with one or more embodiments of the invention.

FIG. 2C shows a diagram of the blocks of FIG. 2B. FIG. 2C includes a diagram of leaf block A (224), a diagram of indirect block 1A (216), a diagram of indirect block 2A (212), and a diagram of the top block (210). Each block illustrated in FIG. 2C is discussed below.

In one or more embodiments of the invention, the leaf block (224) includes an item range (224A) and a list of hashed item identifiers (224B). Each hashed item identifier in the list of item identifiers (224B) is within the item range (224A). More specifically, a hash function is applied to each item in the list or to an identifier associated with each item in the list. The result of a set of hash item identifier. The hashed item identifiers are then distributed across the leaf blocks in the hierarchical block tree. The specific hashed item identifiers associated with leaf block A (224) are stored in the list of hashed item identifiers (224B). The item range (224A) of hash item identifiers is a contiguous range of hashed item identifiers, where the specific hash item identifiers associated with leaf block A (224) are part of the aforementioned range. In one or more embodiments of the invention, the item range for each leaf block is predetermined at the time the hierarchical block tree is created. The leaf block (224) may include other content without departing from the invention.

In one or more embodiments of the invention, indirect block 1A (216) includes a covered range of block 1A (216A) and a hash of leaf block A (216B). In this example, the block 1A covered range (216A) specifies the same range as the item range (224A) of leaf block A (224).

In one or more embodiments of the invention, the hash of leaf block A (216B) is generated by applying a hash function on all or a portion of leaf block A (224). The indirect block 1A (216) may include other content without departing from the invention.

In one or more embodiments of the invention, indirect block 2A (212) includes a covered range (212A), a hash of indirect block 1A (212B) and a hash of indirect block 1B (212C). The covered range (212A) of indirect block 2A (212) may be a range that includes the ranges of indirect blocks 1A (216) and 1B (218). For example, if indirect block 1A covers range 1-100 and indirect block 1B covers ranges 100-200, then indirect block 2A (212) covers ranges 1-200.

In one or more embodiments of the invention, the hash of indirect block 1A (212B) is generated by applying a hash function on all or a portion of indirect block 1A (216). Further, the hash of indirect block 1B (212C) is generated by applying a hash function on all or a portion of indirect block 1B (218). The indirect block 2A (212) may include other content without departing from the invention.

In one or more embodiments of the invention, the top block (210) includes a top block covered range (210A), a hash of indirect block 2A (210B) and a hash of indirect block 2B (210C). The covered range (210A) of the top block (210) may be a range that includes the ranges of indirect blocks 2A (212) and 2B (214).

In one or more embodiments of the invention, the hash of indirect block 2A (210B) is generated by applying a hash function on all or a portion of indirect block 2A (212). Further, the hash of indirect block 2B (210C) is generated by applying a hash function on all or a portion of indirect block 2B (214). In one or more embodiments of the invention, a top hash may be a hash of a combination of the hash of indirect block 2A (210B) and the hash of indirect block 2B (210C). The top hash may be used to generate a signature to be used for verification. The signature may be generated using the top hash (or any portion thereof) in combination with a private key associated with the trust system and one (or more) functions.

While the above example describes the hierarchical block tree as including hashed item identifier, embodiments of the invention may be implemented using item identifier (i.e., identifiers that are not hashed without departing from the invention).

Further, while the above example describes item ranges that overlap (e.g., 0-100 and 100-200), embodiments of the invention may be implemented with non-overlapping item ranges without departing from the invention (e.g., 0-100 and 101-200). The top block (210) may include other content without departing from the invention.

While FIG. 2C describes the indirect blocks (212, 216) and the top block (210) as including the covered ranges, in other embodiments of the invention, the aforementioned blocks do not include covered ranges. More specifically, while each of the blocks in the hierarchical block tree may be logically associated with a covered range, the specific content in the top block and indirect blocks does not include the covered range; rather, the top block includes N−1 values that may be used by the untrusted device to traverse the hierarchical block tree, where N is the number of indirect blocks directly connected to the top block and the values are based on the covered ranges logically associated with the N−1 indirect blocks. Further, each indirect block includes M−1 values that may be used by the untrusted device to traverse the hierarchical block tree, where M is the number of indirect blocks or leaf blocks directly connected to the indirect block and the values are based on the covered ranges logically associated with the M blocks. In this manner, only the leaf blocks may include an item range (224A), the other blocks in the hierarchical block tree only include values that are used by the untrusted system to efficiently traverse the hierarchical block tree to the appropriate leaf block. The aforementioned N−1 values and M−1 values may be collectively referred to as traversal values.

For example, consider a scenario in which the top block is logically associated with a covered range of 0-200 is directly connected to two indirect blocks, A and B. In this scenario, indirect block A is logically associated with a covered range of 0-80 and indirect block B is logically associated with covered range 81-200. Accordingly, the top block may include the value 81. A comparison may be made between the hash item identifier and the value 80 to determine whether to traverse to indirect block A or B. If the hash item identifier has a value less than or equal to 80, then traversal proceeds to indirect block A; otherwise, the traversal proceeds to indirect block B. The above example is not intended to limit the scope of the invention.

Figure 3A:
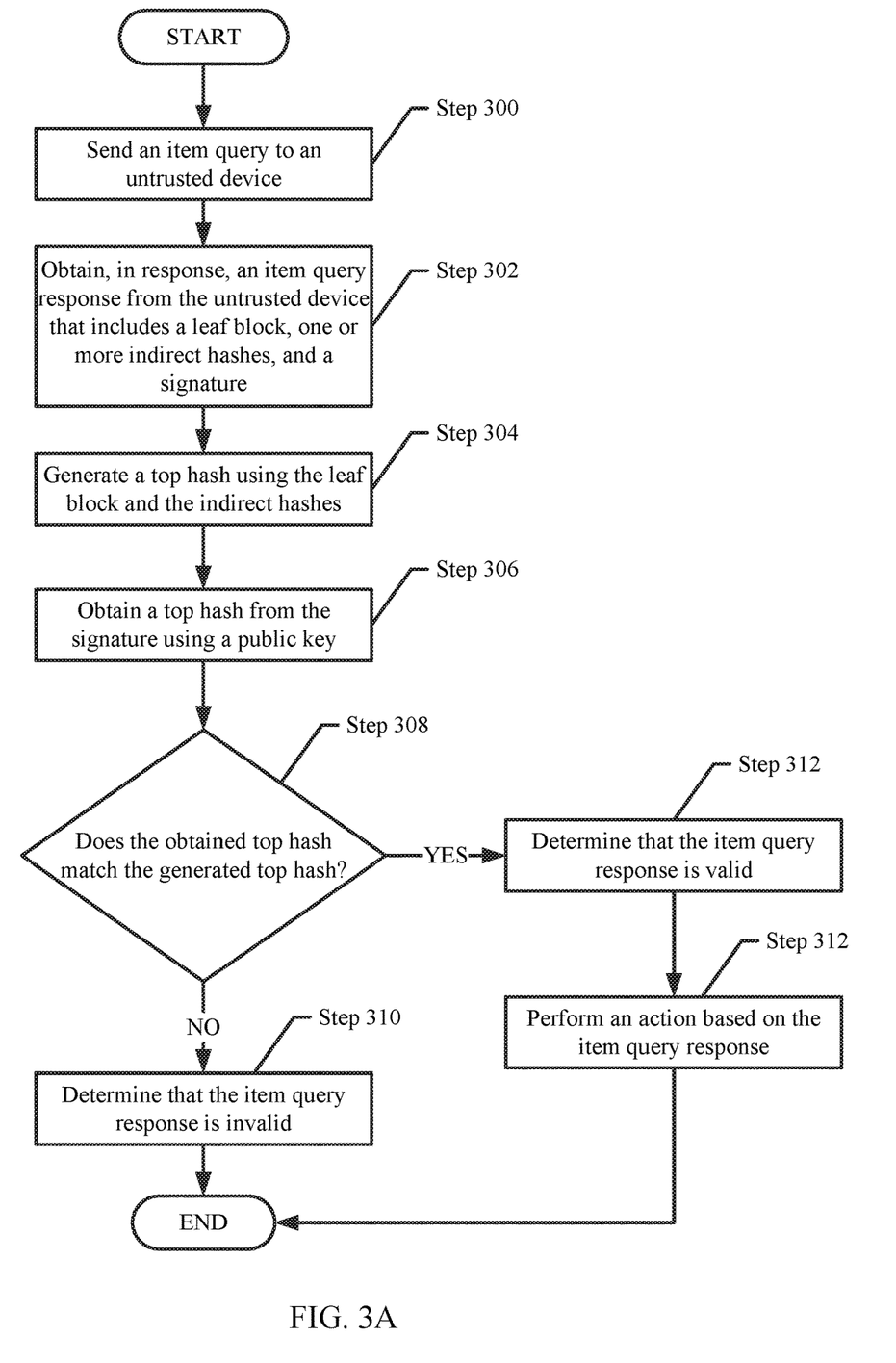
FIG. 3A shows a flowchart for verifying an item query response in accordance with one or more embodiments of the invention.
Figure 3B:
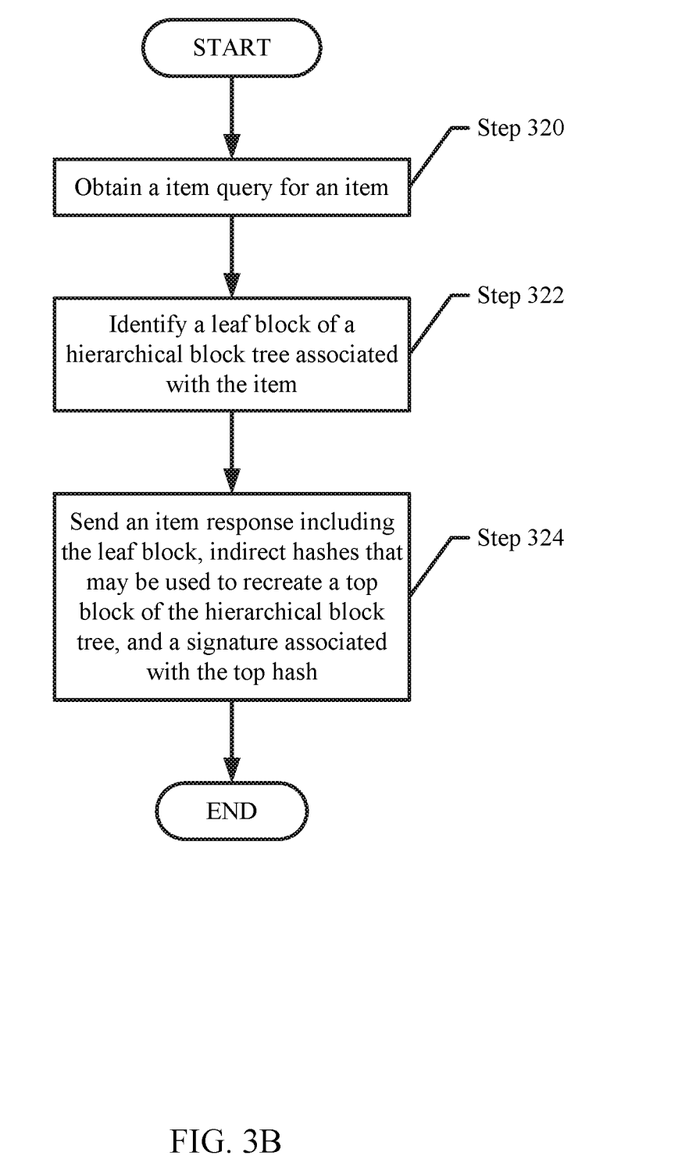
FIG. 3B shows a flowchart for servicing an item query in accordance with one or more embodiments of the invention.
Figure 3C:
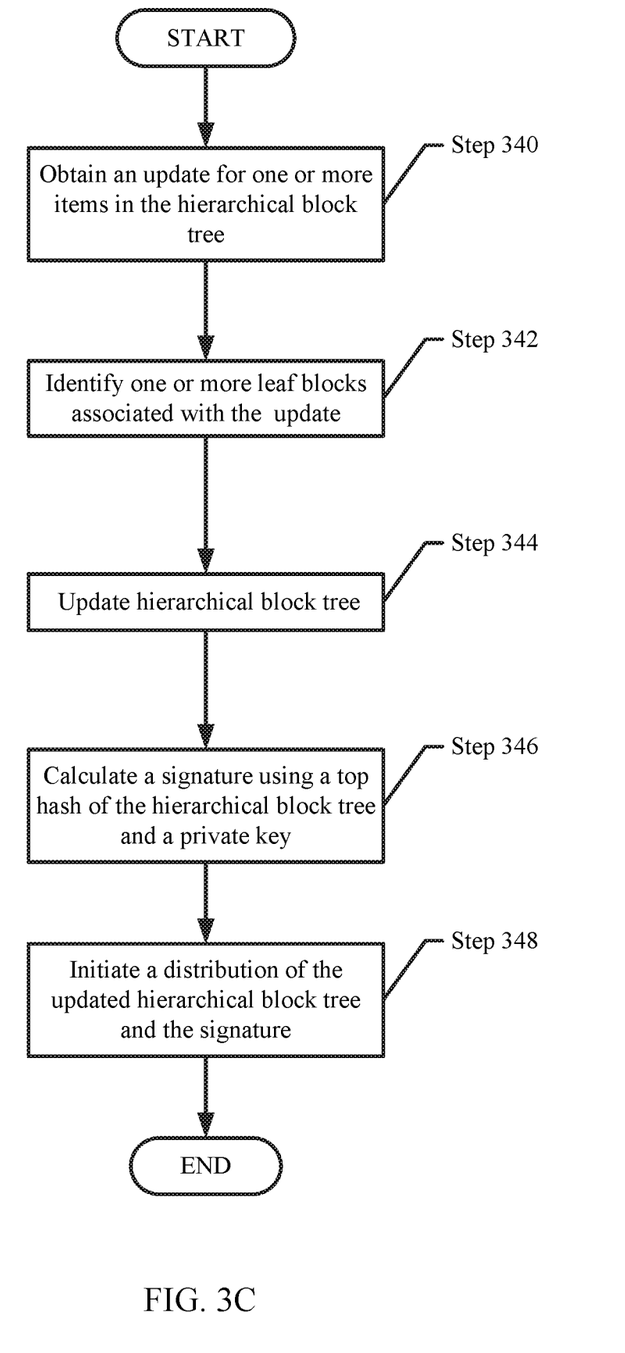
FIG. 3C shows a flowchart for updating a hierarchical block tree in accordance with one or more embodiments of the invention.

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart for verifying an item query response in accordance with one or more embodiments of the invention. The method shown in FIG. 3A may be performed by, for example, a querying system (104, FIG. 1). Other components of the system illustrated in FIG. 1 may perform the method of FIG. 3A without departing from the invention.

Turning to FIG. 3A, in step 300, an item query is sent to an untrusted device. The item query may be used to determine whether a given item (represented by an item identifier or a hashed item identifier) is present or not present in the hierarchical block tree. As discussed above, each of the untrusted devices includes a hierarchical block tree, which it represents as being the same hierarchical block tree that it obtained from the trusted system. The item query may be sent to any of the untrusted devices. By having multiple untrusted devices, each with a copy of the hierarchical block tree, the system is scalable. Specifically, if the number of item queries issued by the query device(s) increases, then the number of untrusted devices that may be used to service the item query may also increase to meet the aforementioned demand. The specific untrusted device to which the item query is sent may be selected using any known (e.g., round-robin selection, arbitrary selection, etc.) or later discovered mechanism. The item query may include an item identifier or a hashed item identifier. In one embodiment of the invention, the hash item identifier is an obtained by applying a hash function to an item identifier or to the content of the item. The item identifier may include any combination of numbers, letters, and/or symbols.

In step 302, an item query response is obtained from the untrusted device. The item query response may include a leaf block, one or more indirect hashes associated with one or more indirect blocks, and a signature. The leaf block may specify a portion of the item identifiers of the list (which may or may not include the requested item identifier) and an item range associated with the leaf block.

In one or more embodiments of the invention, the item query response further includes an assertion about whether the queried item (i.e., the item that was specified using the item identifier or hashed item identifier in the query request) is in the list. The querying device may confirm this assertion by analyzing the obtained hashed item identifiers and determining whether any of the obtained hashed item identifiers is (or corresponds to) with the queried item. If none of the obtained hashed item identifiers are associated with the queried item, the querying device determines that the queried item is not on the list. This may be true even when the hashed item identifier (if present) is in the item range of the leaf block. Conversely, if one of the obtained hashed item identifiers is associated with the queried item, the querying device determines that the queried item is on the list.

Though the querying device may have determined whether the item is on the list of the untrusted device based on the item query response, steps 304-312 may be performed to verify the validity of the item query response. The verification may be justified due to the possibility that the untrusted device may provide a malicious, outdated, or otherwise inaccurate item query response. The queried item may use the leaf block, the indirect blocks, and/or the signature to perform this verification.

In step 304, a top hash is generated using the leaf block and the indirect blocks. In one or more embodiments of the invention, the top block is generated by performing a function (e.g., the hash function) on the leaf blocks and the obtained indirect hashes based on the hierarchical block tree in a manner associated with the structure in which the list is stored in the untrusted device.

In one or more embodiments of the invention, the hash function is performed on the leaf block(s) to generate an indirect hash. A hash function is then applied to the generated indirect hash along with at least one sibling indirect hash to generate a second indirect hash. This process is repeated for each level in the hierarchical block tree until a top hash is generated using the aforementioned indirect hashes.

In step 306, a top hash is obtained from the signature using a public key associated with the trusted system and accessed by the querying system. In one or more embodiments of the invention, the querying system performs an algorithmic function on the signature using the public key to decrypt, or otherwise obtain, the top hash from the signature.

In step 308, a determination is made about whether the obtained top hash of step 306 matches the generated top hash of step 304. If the obtained top hash of step 306 matches the generated top hash of step 304, the method proceeds to step 312; otherwise, the method proceeds to step 310.

In step 310, the queried system determines that the item query is invalid. Based on this determination, the queried system is unable to determine whether the queried item is truly included in the list, and, subsequently, may not take any action based on the item query response.

In step 312, following the determination that the two top hashes match, the queried system determines that the item query response is valid.

In step 314, an action is performed based on the item query response. The action may be based on the type of list that was analyzed. For example, the list may include a list of valid electronically signed documents. If the querying device determines that an identifier associated with a given electronically signed document is on the list, then the querying device may use the electronically signed document.

In another example, the list may include a list of invalid electronically signed documents. If the querying device determines that an identifier associated with a given electronically signed document is on the list, then the querying device may determine that the electronically signed document is invalid and then not use this electronically signed document. The invention is not limited to the aforementioned examples.

FIG. 3B shows a flowchart for servicing an item query in accordance with one or more embodiments of the invention. The method shown in FIG. 3B may be performed by, for example, an untrusted device (100A, 100B, FIG. 1). Other components of the system illustrated in FIG. 1 may perform the method of FIG. 3B without departing from the invention. The method shown in FIG. 3B may be performed in response to a step 300 being performed by a querying device.

In step 320, an item query for an item identifier or a hashed item identifier is obtained. The item query may be obtained from the querying system. In one or more embodiments of the invention, if the item identifier included in the item query is not a hashed item identifier, the untrusted device may apply a hash function to the item identifier to obtain a hashed item identifier.

In step 322, a leaf block associated with the item identifier is identified using a hierarchical block tree. In one or more embodiments of the invention, the leaf block is identified by traversing the indirect blocks using the covered ranges and/or other information in to the indirect blocks (e.g., the traversal values) until a leaf block is identified that specifies a range in which the hashed item identifier is associated.

For example, the leaf block may be identified by identifying a covered range of the top block of the hierarchical block tree. Each of the indirect blocks associated with the top block is then analyzed to identify which of the indirect blocks includes a covered range in which the hashed item identifier is located. The aforementioned process is repeated until an indirect block that references a leaf block that includes an item range in which the hashed item identifier is included is identified. The invention is not limited to traversing the hierarchical block trees using covered ranges. For example, the hierarchical block tree may be traversed using the traversal values.

In one or more embodiments of the invention, after identifying the leaf block that may include the hashed item identifier, the untrusted system further analyzes the identified leaf block to determine whether the hashed item identifier is included in the list of hashed item identifiers in the leaf block. Alternatively, this analysis may be omitted. If this analysis is omitted, the querying system may, itself, make the determination about whether the hashed item identifier is included in the list of hashed item identifiers.

In step 324, an item query response is sent to the querying system. In one or more embodiments of the invention, the item query response includes the identified leaf block, indirect hashes of indirect blocks that may be used to recreate a top hash, and a signature associated with the top hash. In one or more embodiments of the invention, the signature is a signature of the top hash generated using a private key of a trusted system.

In one or more embodiments of the invention, the item query response further includes an assertion about whether the item is included in the list. Whether the statement is included is based on whether the untrusted device analyzed the leaf block to search for the hashed item identifier of the item query.

FIG. 3C shows a flowchart for updating a hierarchical block tree in accordance with one or more embodiments of the invention. The method shown in FIG. 3C may be performed by, for example, a trusted system (102, FIG. 1). Other components of the system illustrated in FIG. 1 may perform the method of FIG. 3C without departing from the invention.

In step 340, an update is obtained for one or more items in the hierarchical block tree. The update may be obtained from, for example, a secondary trusted source. The update may specify that one or more items are to be removed and/or deleted from the list. Alternatively, the update may include item identifiers for each item that is to be removed and/or deleted from the list. In one or more embodiments of the invention, hierarchical block tree stores hashed item identifiers and the item identifiers are not hashed item identifiers, the trusted system applies a hash function on the item identifiers to obtain hashed item identifiers.

In step 342, one or more leaf blocks associated with the update are identified. The leaf blocks are identified by identifying an item range in which each hashed item identifier is within. The leaf blocks associated with the identified item range(s) are identified. The identified leaf blocks may be updated by removing and/or including the hashed item identifiers in accordance with the update.

In step 344, the updated hierarchical block tree is updated. The updating includes hashing all updated leaf blocks to obtain hashes associated with the updated leaf blocks. The hashes associated with the updated leaf blocks are then used to generate updated indirect blocks. The updated indirect blocks are then hashed to generate updated indirect hashes, which are then used to generate other indirect blocks or the top block. The calculation of updated hash values continues until an updated top hash is calculated.

In step 346, a signature is calculated using the top hash and a private key of the trusted system. In one or more embodiments of the invention, the signature is calculated by performing an encryption algorithm to the top hash using the private key.

In step 348, a distribution of the hierarchical block tree and the signature is initiated. In one or more embodiments of the invention, the distribution is initiated by sending a copy of the updated hierarchical block tree and the signature to one or more untrusted devices to be stored and used to service item query responses. The trusted system may send this data to all untrusted devices in a distributed system.

In one or more embodiments of the invention, the trusted system sends the updated hierarchical block tree and the signature to one untrusted device and prompts the untrusted device to distribute the data to the other untrusted device. In this manner, the data is consistent throughout the untrusted devices.

Other mechanisms for distributing the updated hierarchical block tree may be updated without departing from the invention.

EXAMPLE

Figure 4A:
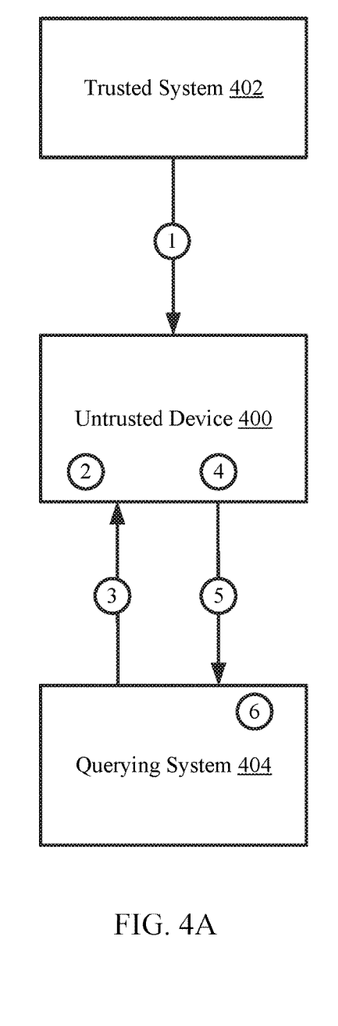
FIGS. 4A-4B show an example in accordance with one or more embodiments of the invention.
Figure 4B:
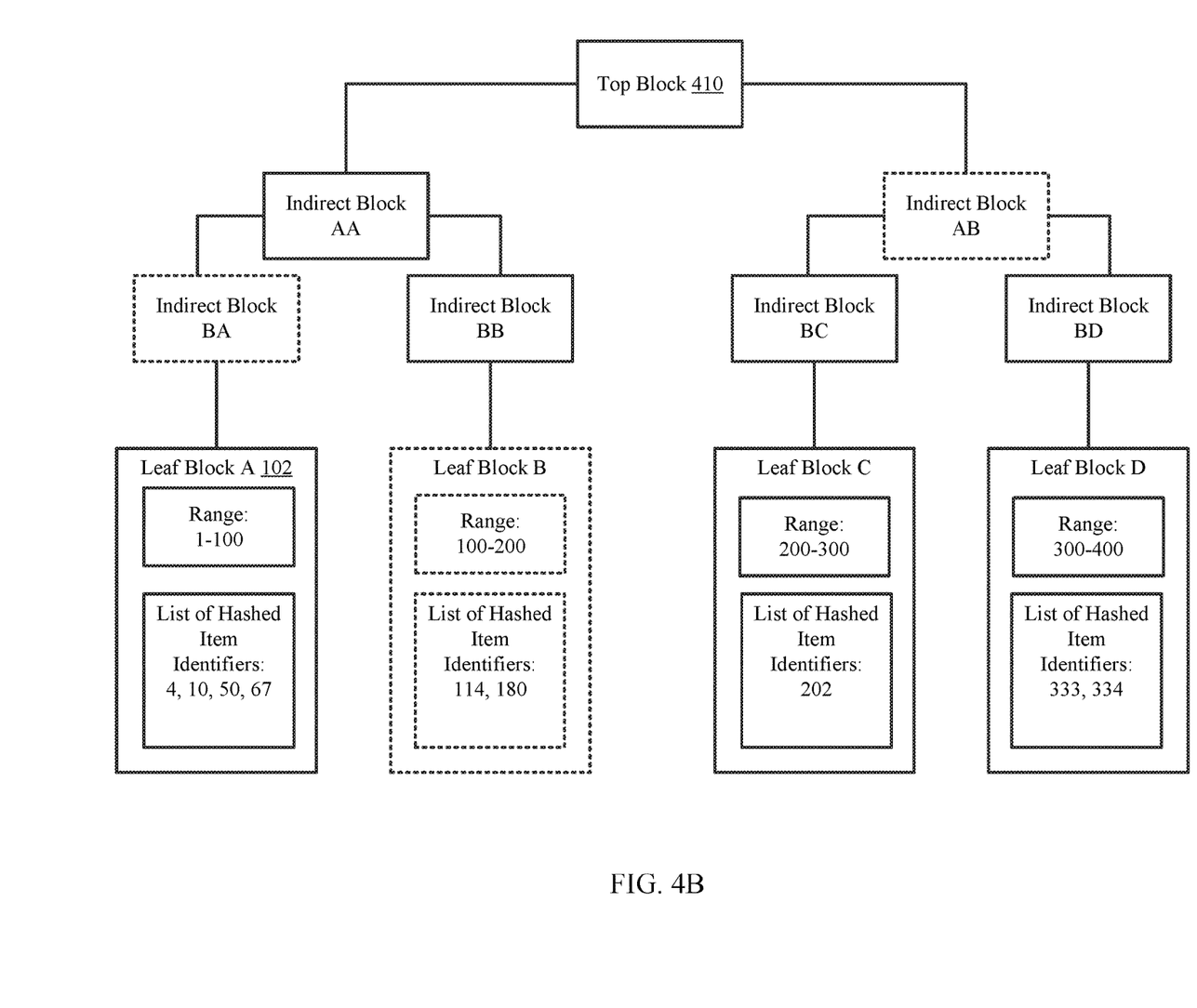

The following section describes an example. The example, illustrated in FIGS. 4A-4B, is not intended to limit the invention. Turning to the example, consider a scenario in which a querying system would like to know whether an item is included in a whitelist to verify its validity.

FIG. 4A shows a diagram of an example system in accordance with one or more embodiments of the invention. The example system includes a trusted system (402), an untrusted device (400), and a querying system (402).

The trusted system (402) generates a hierarchical block tree for the valid list and distributes the list, and a signature of a top block of the hierarchical block tree, to the untrusted device (400) [1]. The untrusted device (400) stores the hierarchical block tree [2].

At a later point in time, the querying system (404) sends an item query to the untrusted device (400) to specify whether a hashed item identifier is included in the list [3]. The hashed item identifier may be the number 114. The hashed item identifier is included in the item query.

The untrusted device (400) performs the method of FIG. 3B to identify a leaf block that may include the hashed item identifier [4].

Referring to FIG. 4B, FIG. 4B shows a diagram of the hierarchical block tree stored in the untrusted device of FIG. 4A. The hierarchical block tree may include a top block (410), indirect blocks AA, AB, BA, BB, BC, and BD, and leaf blocks A, B, C, and D. The untrusted device identifies the leaf block that includes the item range that is within the hashed item identifier (i.e., 114) by identifying the covered range of the top block (410). The top block (410) is logically associated with a covered range of 1-400.

The untrusted device further analyzes the hierarchical block tree by identifying the indirect block associated with 114. Indirect block AA is logically associated with a covered range of 1-200, while indirect block AB is logically associated with a covered range of 200-400. In such case, the untrusted device analyzes the indirect blocks (i.e., BA, BB) associated with indirect block AA.

The untrusted device identifies the covered ranges of each of indirect block BA and BB. Indirect block BA is logically associated with a covered range of 1-100, while indirect block BB is logically associated with a covered range of 100-200. Based on these covered ranges, the untrusted device identifies the leaf block (i.e., B) associated with indirect block BB. To save further processing of the untrusted device, the untrusted device does not analyze the leaf block B to verify whether hashed item identifier 114 is specified in leaf block B.

After the leaf block is identified, the hashes associated with sibling blocks of each indirect block that was used to identify the leaf block are identified (i.e. a hash from indirect block BA and a hash indirect block AB). The leaf block, the aforementioned hashes associated with the sibling blocks (also referred to as sibling hashes), and the signature are sent to the querying system as an item query response [5]. The blocks (or hash of blocks) that are included in the item query response are denoted by the dashed boxes in FIG. 4B.

After the querying system (404) obtains the item query response, the querying system further performs the method of FIG. 3A to verify the validity of the item query response [6]. The method may include using the leaf block and the sibling hashes to generate a top hash, and calculating a second top hash using the obtained signature and a public key, and comparing the two top hashes. More specifically, the hash of indirect block BA may be used with a hash of leaf block B to calculate indirect block AA. The calculated hash of indirect block AA may be used with a hash of block AB to calculate the top hash.

After determining that the two top hashes match, the querying system (404) determines that the item query response is valid, and that the queried item is included in the list. Based on this determination, the queried system accepts the item as valid.

END OF EXAMPLE

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices in a distributed environment. More specifically, embodiments of the invention improve a system that verifies validity of an item query response from an untrusted source.

In current implementations, there are mechanisms for querying whether an item is included in a list. In these current implementations, the query may be sent to a trustworthy source or to a scalable database, but not both. Embodiments of the invention incorporate the trustworthiness of a device with a private key used for verification with the scalability of using multiple devices (which may be on-line) in a database for easier access and storage of larger-scale lists.

Embodiments of the invention implement the large scale database by including untrusted devices that store the list in a hierarchical block tree generated by the trusted entities. Each untrusted device can communicate with the querying devices to provide item query responses that specify whether an item is included in the list in addition to means for the querying device to verify the validity of the item query response.

Embodiments of the invention implement the trustworthiness of the system by using a trusted entity that generates signatures of the hierarchical block trees that cannot be replicated by the untrusted devices. The signatures are included in each item query response to allow the querying system to verify whether the blocks in the hierarchical block tree that are sent to the querying device are modified or otherwise inaccurate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by an untrusted device of a plurality of untrusted devices and from a querying system, an item query corresponding to an item;
identifying, by the untrusted device, a leaf block of a hierarchical block tree associated with the item query;
identifying, by the untrusted device, a plurality of indirect blocks that allow the querying system to calculate a top hash of the hierarchical block tree; and
sending, by the untrusted device, an item query response to the querying system, wherein the item query response specifies the leaf block, a plurality of indirect hashes corresponding to the plurality of indirect blocks, and a signature of the top hash, wherein the signature is obtained from a trusted system;
after the sending the item query response, obtaining, by the trusted system, an update to the item;
identifying, by the trusted system and in response to the update, the leaf block of the hierarchical block tree,
updating, by the trusted system, the leaf block based on the update to the item to obtain an updated hierarchical block tree, wherein the updated hierarchical block tree comprises a second top hash;
calculating, by the trusted system, a second signature using the second top hash and a private key of the trusted system; and
initiating, by the trusted system, a distribution of the updated hierarchical block tree using the second signature to the plurality of untrusted devices.

2. The method of claim 1, further comprising:
obtaining, by the untrusted device and from the querying system, a second item query specifying an item identifier;

identifying a second leaf block of the hierarchical block tree that specifies a second item identifier associated with the second item query; and in response to the identifying the second leaf block, sending a second item query response to the querying system, wherein the second item query response specifies the second leaf block, a second plurality of indirect hashes, and the signature of the top hash.

3. The method of claim 1, wherein identifying the leaf block of the hierarchical block tree comprises:
identifying a top block of the hierarchical block tree;
identifying an indirect block associated with the top block logically associated with a covered range;
determining that an item identifier associated with the item query is within the covered range; and
identifying the leaf block that is associated with the indirect block.

4. The method of claim 3, wherein the leaf block comprises an item range and wherein the item range is within the covered range.

5. The method of claim 4, wherein a second leaf block in the hierarchical block tree comprises a second item range, wherein the second item range at least partially overlaps with the item range.

6. The method of claim 1, wherein the leaf block comprises an item range and a list of item identifiers and wherein the item query specifies an item identifier within the item range.

7. The method of claim 1, wherein the plurality of indirect hashes comprises a hash associated with a sibling block of the indirect block.

8. The method of claim 1, wherein in the leaf block does not include an item identifier associated with the item query.

9. The method of claim 1, wherein the item query comprises a hashed item identifier.

10. A system, comprising:
a plurality of untrusted devices, wherein an untrusted device of the plurality of untrusted devices comprises:
a processor;
memory comprising instructions, which when executed by the processor causes the untrusted device to perform a method, the method comprising:
obtaining, from a querying system, an item query;
identifying a leaf block of a hierarchical block tree associated with the item query;
identifying a plurality of indirect blocks that allow the querying system to calculate a top hash of the hierarchical block tree; and
sending an item query response to the querying system, wherein the item query response specifies the leaf block, a plurality of indirect hashes corresponding to the plurality of indirect blocks, and a signature of the top hash, wherein the signature is obtained from a trusted system;
the trusted system comprising:
a second processor; and
second memory comprising instructions, which when executed by the second processor causes the trusted system to perform a second method, the second method comprising:
after the sending the item query, obtaining an update to the item;
identifying, in response to the update, the leaf block of the hierarchical block tree,
updating the leaf block based on the update to the item to obtain an updated hierarchical block tree, wherein the updated hierarchical block tree corresponds to a second top hash;
calculating a second signature using the second top hash and a private key of the trusted system; and
initiating a distribution of the updated hierarchical block tree using the second signature to the plurality of untrusted devices.

11. The system of claim 10, wherein the method further comprises:
obtaining, from the querying system, a second item query specifying an item identifier;
identifying a second leaf block of the hierarchical block tree that specifies a second item identifier associated with the second item query; and
in response to the identifying the second leaf block, sending a second item query response to the querying system, wherein the item query response specifies the second leaf block, a second plurality of indirect hashes, and the signature of the top hash.

12. The system of claim 10, wherein identifying the leaf block of the hierarchical block tree comprises:
identifying a top block of the hierarchical block tree;
identifying an indirect block associated with the top block logically associated with a covered range;
determining that an item identifier associated with the item query is within the covered range; and
identifying the leaf block that is associated with the indirect block.

13. The system of claim 12, wherein the leaf block comprises an item range and wherein the item range is within the covered range.

14. The system of claim 13, wherein a second leaf block in the hierarchical block tree comprises a second item range, wherein the second item range at least partially overlaps with the item range.

15. The system of claim 10, wherein the leaf block comprises an item range and a list of item identifiers and wherein the item query specifies an item identifier within the item range.

16. The system of claim 10, wherein the plurality of indirect hashes comprises a hash associated with a sibling block of the indirect block.

17. The system of claim 10, wherein in the leaf block does not include an item identifier associated with the item query.

18. The system of claim 10, wherein the item query comprises a hashed item identifier.

* * * * *